United States Patent [19]
Wisbey et al.

[11] Patent Number: 5,612,579
[45] Date of Patent: Mar. 18, 1997

[54] POWER DISTRIBUTION CENTER

[75] Inventors: Peter J. Wisbey, Machensey Park; Lee R. Rateike, Rockford, both of Ill.

[73] Assignee: Sundstrand Corporation, Rockford, Ill.

[21] Appl. No.: 469,959

[22] Filed: Jun. 6, 1995

Related U.S. Application Data

[62] Division of Ser. No. 113,866, Aug. 27, 1993.
[51] Int. Cl.⁶ .................................................. H02J 1/10
[52] U.S. Cl. ........................... 307/18; 290/4 R; 307/43; 307/84
[58] Field of Search ................... 307/18, 19, 29, 307/38, 39, 40, 41, 42, 85–87, 71, 84, 57, 43, 64, 66, 9.1, 23, 24; 290/4 R; 322/28, 33; 364/492

[56] References Cited

U.S. PATENT DOCUMENTS

| | | | |
|---|---|---|---|
| 4,551,632 | 11/1985 | Jourdan et al. | 307/9 |
| 5,199,912 | 4/1993 | Dade et al. | 290/4 R |
| 5,466,974 | 11/1995 | Sutrina et al. | 307/38 |

*Primary Examiner*—William M. Shoop, Jr.
*Assistant Examiner*—Jonathan S. Kaplan
*Attorney, Agent, or Firm*—Jeffery J. Makeever

[57] ABSTRACT

An electric power distribution center for use on aircraft comprises a space frame having a first surface defining a plurality of sockets, and a second, generally parallel, surface defining a plurality of connector ports; a plurality of conducting bus bars utilizing a three dimensional routing configuration encapsulated within the space frame; current sensors integrally mounted within the space frame for monitoring the flow of electrical current through the conducting bus bars; and a printed circuit board encapsulated within the space frame for providing electrical circuit pathways within the power distribution center. Further, a plurality of load protection and control devices, seated within the sockets of the first surface, provide a switchable coupling between the bus bars and the printed circuit board to control the distribution of electric power to the individual aircraft loads. Connectors mounted on the second surface of the power distribution center provide the interface connection from the internal circuit connection means and current sensing means to external devices.

7 Claims, 4 Drawing Sheets

POWER DISTRIBUTION CENTER

CROSS-REFERENCE TO RELATED APPLICATIONS

This is a Divisional of U.S. application Ser. No. 08/113,866, filed Aug. 27, 1993.

This application is related to commonly assigned, copending U.S. application Ser. No. 08/019,507, entitled "Electric Power Distribution Module for an Electric Power Generation and Distribution System", filed Feb. 19, 1993.

FIELD OF THE INVENTION

The present invention relates generally to electric power distribution, and more particularly to an electric power distribution center integrating main power distribution and switching components and individual load distribution and protection components with system monitoring and control components for use on aircraft.

BACKGROUND ART

Electric power generation and distribution systems for small and medium sized aircraft 10, as shown in FIG. 1, typically comprise a generator 14 which is located on and driven by each of the aircraft's engines 18, 20, large main power feeders 22 capable of conducting twice the rated current required by the system during normal operation which are routed from the output of each generator 14, through the fuselage 26, to a centralized power center 12 located in the nose of the aircraft, and several hundred individual load distribution feeders 28 which distribute the electric power from this centralized power center 12 in the nose to the individual pieces of utilization equipment located throughout the aircraft 10. Weight considerations require that the main feeders along the length of the fuselage 26 to the power center 12 utilize parallel aluminum feeders 22a, 22b (see FIG. 2) as opposed to the single larger gauge copper feeder set used elsewhere in the distribution system. For a two engine aircraft 10 the generation and distribution channels are essentially symmetrical, and the following discussion will therefore concern itself with one channel.

In the power center 12 the main power distribution is controlled by a generator line contactor 30, see FIG. 2, which connects the electric power from the generator 14 to the main load bus 34, and by a bus tie contactor 32 which connects the load bus 34 to a tie bus 40. This connection allows electric power to be supplied to a load bus 34 by the unassociated (other channel's) generator, or by external power through an external power contactor 42. Power distribution to the individual pieces of utilization equipment is controlled by individual circuit breakers 36 which are coupled to the main load buses 34. These individual circuit breakers 36 are located in the cockpit behind the pilot and co-pilot on a large circuit breaker panel 38.

Protection of the main power distribution is provided by current transformers which are positioned throughout the distribution system to create zones of protection. Current transformers located within the generator 14 (not shown) define the entrance to a zone of protection which extends from the generator 14, along the length of the main feeders 22 to the load bus 34, at which point a line current transformer 44 defines an exit to the zone leading to the load bus 34. An additional line current transformer 48 defines another exit to the zone leading to the tie bus 40. If the current sensed entering the zone from the generator does not equal the current sensed exiting the zone to the load bus 34 and to the tie bus 40, a short circuit exists within the zone, and the associated generator 14 and load bus 34 are electrically removed from the system. A tie bus current transformer 46 provides protection for the tie bus 40 when the bus tie contactors 32 are closed coupling one generator to both load buses 34. These tie bus current transformers 46 also provide protection for the tie bus 40 when an external power source (not shown) is connected to the load buses 34 with the addition of an external power current transformer 50. Protection for open circuits along the length of the parallel feeders 22a, 22b is provided by parallel feeder current transformers 52a, 52b which sense the current flow in each phase of the feeders 22a, 22b. If the current flow in phase A, for example, of parallel feeder set 22a does not equal the current flow in phase A of parallel feeder set 22b, the associated generator 14 is electrically removed from the system and the bus tie contactor 32 is closed to allow power to be supplied to the load bus 34 via the tie bus 40.

One shortcoming associated with this prior art distribution system is that the size of the main feeders 22 (see FIG. 1) required to minimize voltage drop from the engine 18, 20 to the centralized power center 12 in the nose during rated current loading conditions increases the system weight. Additionally, since the power center 12 is located in the nose of the aircraft 10 and the utilization equipment is distributed throughout the aircraft 10, the size of the individual load distribution feeders 28 must be increased for the same reason. On an aircraft each additional pound translates directly into increased fuel burn, and thus higher operating costs for the airline.

Increased costs are also introduced into the prior art distribution system by the method of construction of the power center 12 and circuit breaker panel 38 (FIG. 2). The power center 12 is constructed from discrete components which are bolted to a framework assembly and wired together by hand. The construction of the circuit breaker panel 38 requires that each individual circuit breaker (as many as 350) be hand soldered to an individual load distribution feeder 28 which is connected to the load bus 34 located in the centralized power center 12, and to another individual load distribution feeder 28 which will be connected to its associated piece of utilization equipment. In addition to the increased system costs introduced by the manufacturing method of the prior art distribution system, additional costs, as well as weight, are incurred due to the number of current transformers which are required to protect the system from wiring failures. These additional components also serve to lower the overall system reliability.

The present invention is directed at overcoming one or more of the above mentioned shortcomings.

SUMMARY OF THE INVENTION

It is the principle object of the instant invention to overcome the shortcomings of the prior art by providing a new and improved power distribution system. More specifically, it is the object to provide a power distribution system for use on preferably small to medium sized aircraft which will reduce system cost, weight and complexity while increasing overall system reliability and performance.

The instant invention achieves the foregoing objectives in an electric power generation and distribution system through the use of power distribution centers which integrate main power distribution and switching components and individual load distribution and protection components with system monitoring and control components. Each power distribution center comprises a molded space frame having first and second generally parallel faces which define a volume therebetween. The first face includes a plurality of sockets formed therein, and the second a plurality of connector ports. A plurality of conducting bus bars utilizing a three dimensional routing configuration are encapsulated within the molded space frame, as are integrally mounted current sensors which monitor the flow of electrical current through the bus bars.

An exemplary embodiment of the instant invention includes at least one printed circuit board encapsulated within the molded space frame for providing electrical circuit pathways within the molded space frame. To provide individual load distribution and protection, a plurality of load protection and control devices which switchably couple the bus bars to the circuit board(s) are seated within the sockets formed within the first surface of the molded space frame. A plurality of connectors which penetrate the connector ports formed within the second surface of the molded space frame are also provided. These connectors couple the current sensors and the printed circuit board to external devices.

BRIEF DESCRIPTION OF THE DRAWINGS

Reference is now made to the Description of the Preferred Embodiments, taken in conjunction with the accompanying illustrations, in which.

DESCRIPTION OF THE PREFERRED EMBODIMENTS

Figure 3:
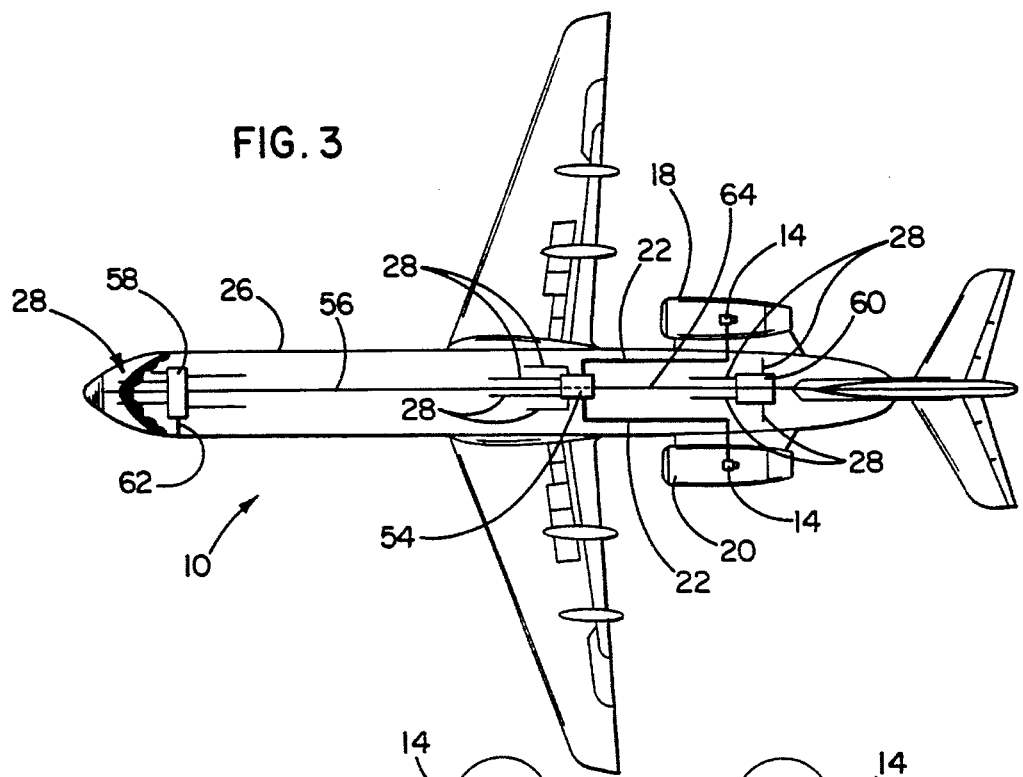
FIG. 3 is an outline drawing of an aircraft illustrating the feeder routing of an electric power generation and distribution system constructed in accordance with the instant invention.

FIG. 3 illustrates a medium sized aircraft 10 with a seating capacity of approximately one hundred to which the instant invention is particularly well suited. The electric power generation and distribution system comprises a generator 14 which is coupled to and driven from each of the aircraft's engines 18, 20. The output of each generator 14 is coupled by main power feeders 22 to a central power distribution center 54 located within the fuselage 26 near the wing root. This central power distribution center 54 is coupled by secondary power feeders 56 to a fore power distribution center 58 located in the nose of the aircraft, and by secondary power feeders 64 to an aft power distribution center 60 located near the tail of the aircraft. A connection to the fore power distribution center 58 from the external power plug (not shown) is facilitated by external power feeders 62. Individual load distribution feeders 28 are routed from each of the three power distribution centers 54, 58, 60 to the various pieces of utilization equipment (not shown) located throughout the aircraft 10.

In this exemplary embodiment of the instant invention, the electric power which is produced by the engine mounted generators 14, is transmitted along the main power feeders 22, which are sized based on the total aircraft connected load, to the central power distribution center 54. From this central power distribution center 54 smaller, lighter secondary power feeders 56 transmit electric power to the fore power distribution center 58. These secondary feeders 56 must be capable of transmitting external power to the central and aft power centers 54, 60, and are, therefore, sized based on the combined connected load for these two power distribution centers 54, 60 as opposed to the total aircraft connected load which is the determining factor for the size of the main power feeders 22. The secondary feeders 64 which connect the central 54 and the aft 60 power distribution centers are smaller and lighter still as they are sized based on only the connected load of the aft power distribution center. From each of these centers 54, 58, 60, electric power is delivered to the individual pieces of utilization equipment (not shown). The specific power distribution center 54, 58, 60 from which the loads receive electrical power is dependant on its physical location on the aircraft 10. Loads located in the fore section of the aircraft 10 receive power from the fore power distribution center 58, those in the mid-section from the central power distribution center 54, and those in the aft section from the aft power distribution center 60. In this way the lengths of the individual power feeders 28 are minimized, reducing overall system weight and increasing power quality to the loads.

Figure 4:
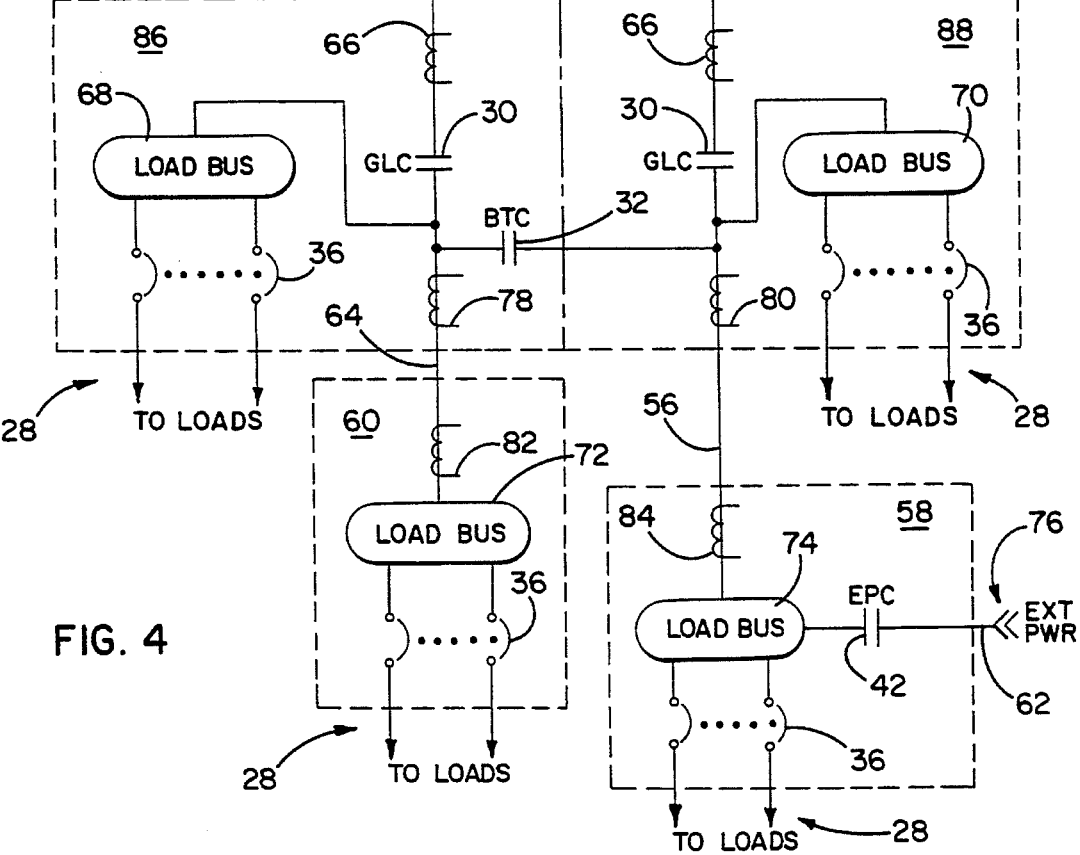
FIG. 4 is a single line diagram illustrating the electric power generation and distribution system of FIG. 3 constructed in accordance with the instant invention.

The electrical distribution structure of this system is illustrated in FIG. 4. The engine driven generators 14 are coupled by main power feeders 22 to the central power distribution center 54. Within this power distribution center 54 the main power feeders 22 are switchably coupled through a contactor device, as illustrated by generator line contactor 30, to a left load bus 68 for the generator 14 coupled to the left engine 20, or to a right load bus 70 for the generator 14 coupled to the right engine 18. In addition to being switchably coupled to their associated generators 14, the left load bus 68 is also switchably coupled to the right load bus 70 by a single bus tie contactor 32. Also coupled to the left load bus 68 via secondary feeders 64 is the aft load bus 72 within the aft power distribution center 60. In a similar manner the right load bus 70 is coupled to the fore load bus 74 within the fore power distribution center 58 via secondary feeders 56. This fore load bus 74 is switchably coupled by the external power contactor 42 via external power feeders 62 to the external power plug 76. Each load bus 68, 70, 72, 74 is coupled to individual pieces of utilization equipment (not shown) through load protection and control devices, such as thermal circuit breakers 36 via individual load distribution feeders 28.

Current sensing means, such as current transformers 66, or alternately shunt resistors or hall effect transducers as appropriate, are positioned within the central power distribution center 54 on the generator side of the generator line contactors 30. Current transformers 78 at the output of the central power distribution center 54 to secondary feeders 64. Another current transformer 80 is positioned at the output to secondary feeders 56. The aft power distribution center 60 contains current transformers 82 positioned at the input from the central power distribution center 54 via secondary feeders 64. The fore power distribution center 58 also contains current transformers 84 positioned at the input from the central power distribution center 54 via secondary feeders 56.

Figure 1:
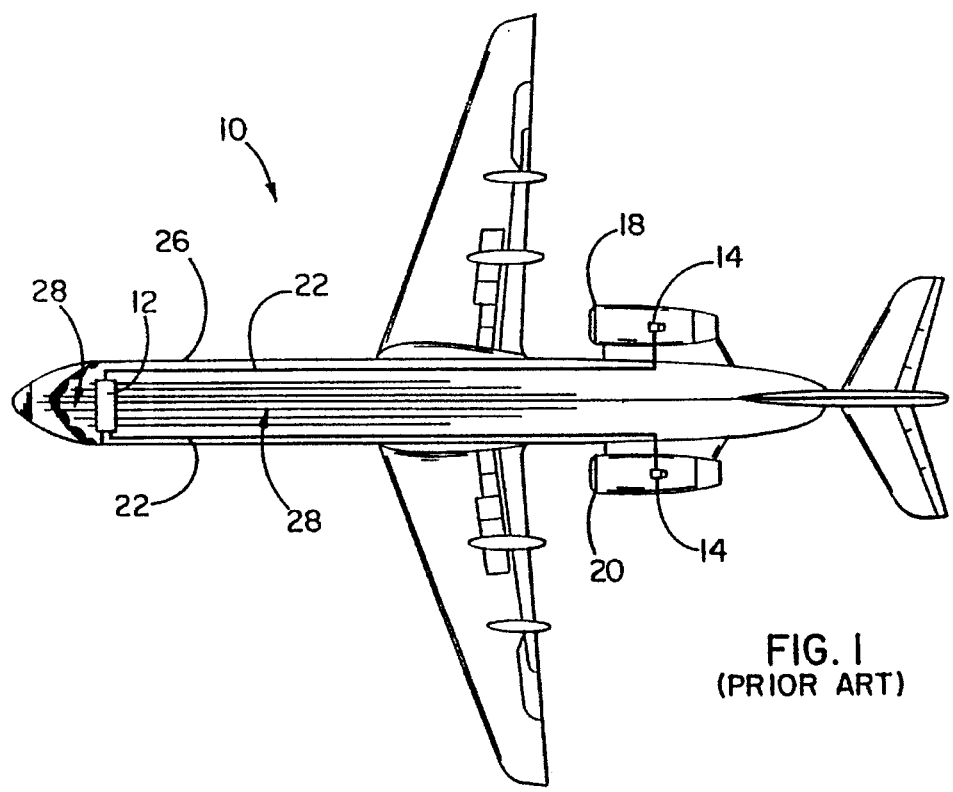
FIG. 1 is an outline drawing of an aircraft illustrating the feeder routing of a prior art electric power generation and distribution system.
Figure 2:
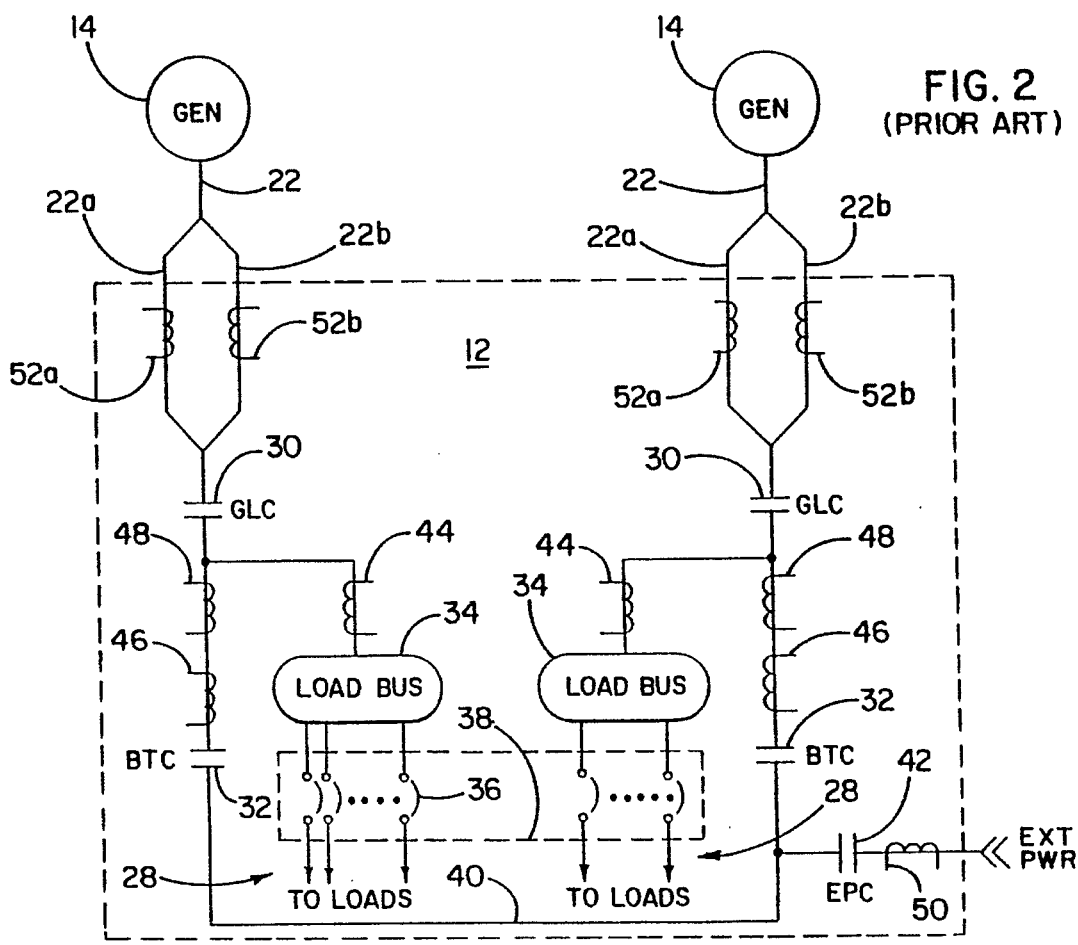
FIG. 2 is a single line diagram illustrating the prior art electric power generation and distribution system of FIG. 1.

The division and restructuring of the load buses 34 (see FIG. 2) from the prior art distribution system into the distribution of buses 68, 70, 72, 74 (see FIG. 4) of the present invention preserves the two channel isolated topology required for these aircraft and maintains essentially equal power utilization from each generator 14 while reducing the total number of system components. Fulfilling the isolation requirement for these aircraft requires that the central power distribution center 54 be composed of two sub-centers, the left central power distribution center 86 and the right central power distribution center 88. Power is still delivered from the generator 14 along main power feeders 22, through the generator line contactor 30 to the loads, but with this system there is no requirement for parallel feeders since the length of the run from the generators 14 to the central power distribution center 54 is so short. With the elimination of the parallel feeders, the need for the additional parallel feeder protection current transformers 52a, 52b (see FIG. 2) is also eliminated.

Unlike the prior art system which uses distributed components coupled by wires and cables and thus has a relatively high potential for differential current faults, that is a single or multiple phase to phase or phase to neutral faults, the distribution system of the instant invention utilizes integrated components within power centers forming fault free zones. Therefore, protection from a differential current fault must only be provided for the feeders 22, 56, 62, 64 which couple the power centers to the generators 14 and to each other. Protection for the main power feeders is simply provided by current transformer 66 and the generator current transformer (not shown). The generator current transformer monitors the current delivered by the generator and the current transformer 66 monitors the current which is received by the central power distribution center 54. If a difference exists between the two readings, the generator 14 is de-energized and the generator line contactor 30 is opened isolating the fault. The bus tie contactor 32 is then closed to allow power to be supplied to the affected load buses 68, 72, or 70, 74 by the opposite generator 14.

Protection for the secondary feeders 64 from the central power distribution center 54 to the aft power distribution center 60 is provided by the current transformer pair 78 and 82. As with the protection for the main power feeders 22, if a difference exists between the current monitored by these two current transformers 78, 82, the associated generator 14 is de-energized and the associated generator line contactor 30 is opened. Unlike the main power feeder fault, this situation requires that the bus tie contactor 32 also be opened to isolate the fault. In a similar manner, protection for the secondary feeders 56 is provided by the current transformer pair 80 and 84. A differential current fault on these feeders 56 also results in the associated generator 14 being de-energized, the associated generator line contactor 30 and the bus tie contactor 32 being opened. In addition, a fault on these feeders results in the external power contactor 42 being locked in the open position, or tripped if it were closed prior to sensing the fault.

Protection for differential current faults on the individual distribution feeders 28 is provided by individual thermal circuit breakers 36 which trip open once their rating has been exceeded. The ratings of these circuit breakers 36 vary depending on the power requirements of the utilization equipment to which it is coupled and on the size of the individual power feeder 28 providing the coupling. In addition to automatically tripping due to an overload, these circuit breakers may be manually opened and closed.

Figure 5:
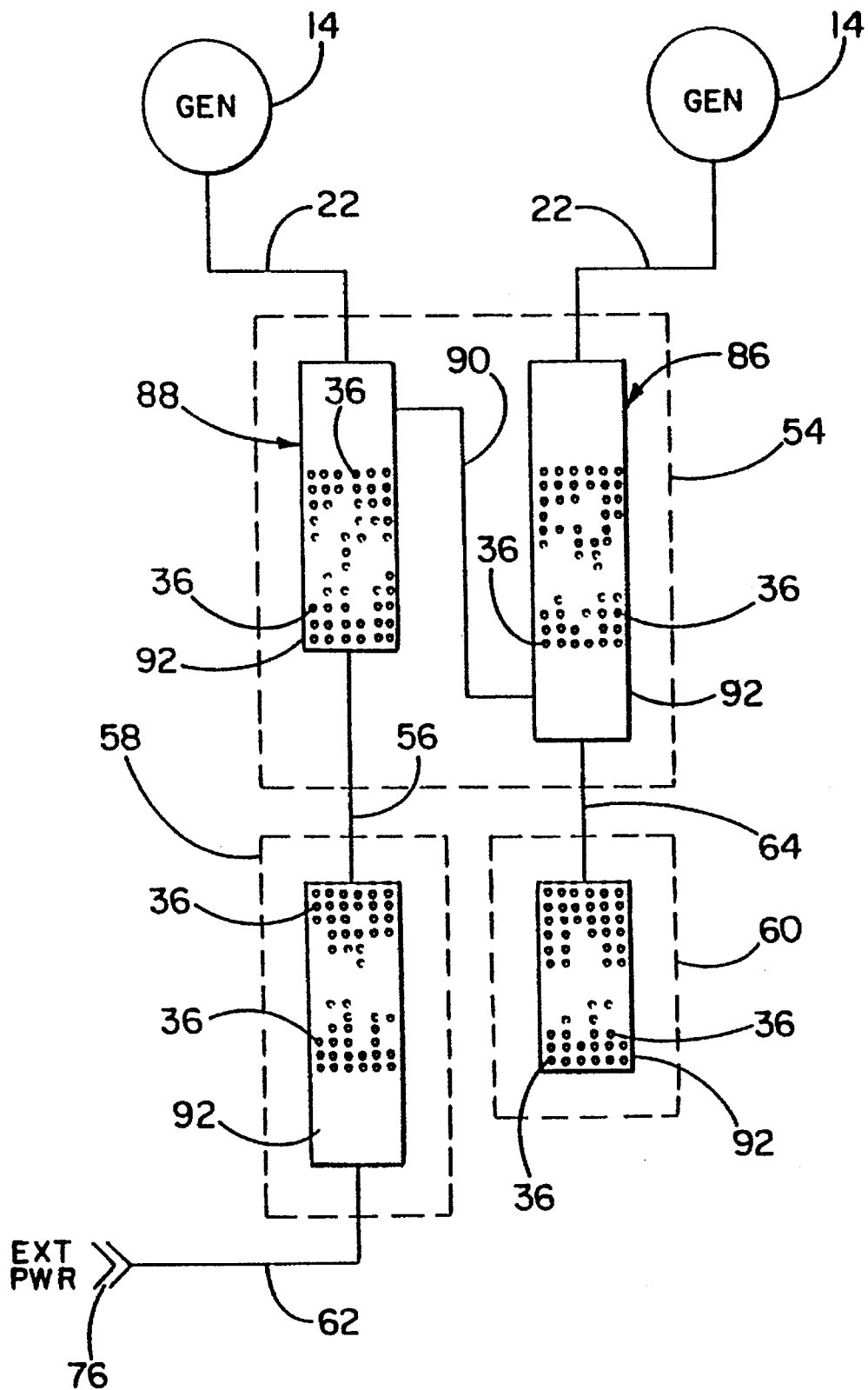
FIG. 5 is an electrical schematic of the electric power generation and distribution system of FIG. 3 constructed in accordance with the instant invention.

FIG. 5 illustrates a physical layout of the power generation and distribution system of the instant invention. The generator 14 driven by the left engine is coupled to the central power distribution center 54, and more specifically the left central power distribution center 86, by main power feeders 22, and the generator 14 driven by the right engine is coupled to the central power distribution center 54, specifically the right central power distribution center 88. The left central power distribution center 86 is coupled to the right central power distribution center 88 by tie bus feeders 90. The left central power distribution center 86 is coupled to the aft power distribution center 60 via secondary feeders 64, and the right central power distribution center 88 is coupled to the fore power distribution center 58 via secondary feeders 56. The fore power distribution center 58 is also coupled to the external power connector 76 via external power feeders 62.

As can be recognized from FIG. 5, the power distribution centers 58, 60, 86, 88 are all embodiments of a single inventive concept which can be modified to suit a particular application. The preferred embodiment of this inventive concept comprises an insulative housing 92, primary power control means for regulating the flow of electrical power into the insulative housing 92, primary power distribution means for directing the flow of electrical power within said insulative housing 92, primary power protection means for monitoring the flow of electrical power through the primary power distribution means, individual load distribution means for directing the flow of electrical power to the individual connected electrical loads, and individual load protection means for interrupting the flow of electrical power to the individual connected electrical loads. The primary power control means comprises a plurality of power feeder terminal connectors 104 (see FIG. 7) in contact with an external source of electrical power, such as generator 14, and switchably connected through at least one contactor device 30, 32 removably mounted on the insulative housing 92 to the primary power distribution means. The primary power distribution means comprises a plurality of power feeders 98 encapsulated within the housing 92 and switchably connected to the power feeder terminal connectors 104 through the contactor device(s) 30, 32. The power feeders 98 are made of conductive metal such as copper, aluminum, or the like.

Additionally, the primary power protection means comprises at least one torroidal current transformer 66 encapsulated within the housing 92 at a point at or near the power feeder terminal connectors 104. The individual load distribution means comprises at least one printed circuit board 100 of at least one layer within the housing 92 routing electrical power from the plurality of power feeders 98 to a first contact 112 on a plurality of screw-in sockets 94 disposed within a surface 92a of the housing 92. The printed circuit board 100 routes electrical power from a second contact 114 on the plurality of screw-in sockets 94 to a plurality of connector ports 96 disposed on a surface 92b of the housing 92 which facilitate electrical connection to external loads requiring electrical power. The individual load protection means comprises a plurality of manually resettable screw-in type thermal circuit breakers 36 screwably seated within the screw-in sockets 94 for switchably connecting the first contact 112 of the screw-in sockets 94 to the second contact 114. Power from the power feeders 98 is routed to the first contact 112 via smaller power feeders 116 on one side of the printed circuit board 100.

Referring again to FIG. 5, the aft power distribution center 60 is the most elemental embodiment of the instant invention comprising a current transformer 82 (see FIG. 4), load distribution bus 72, and its associated thermal circuit breakers 36. The fore power distribution center 58 further comprises a contactor, specifically the external power contactor 42. The right central power distribution center 88 adds an additional set of terminal connectors (not shown) to couple it to the left central power distribution center 86 via tie bus feeders 90. Finally for this application, the left central power distribution center 86 further comprises an additional contactor.

Figure 6:
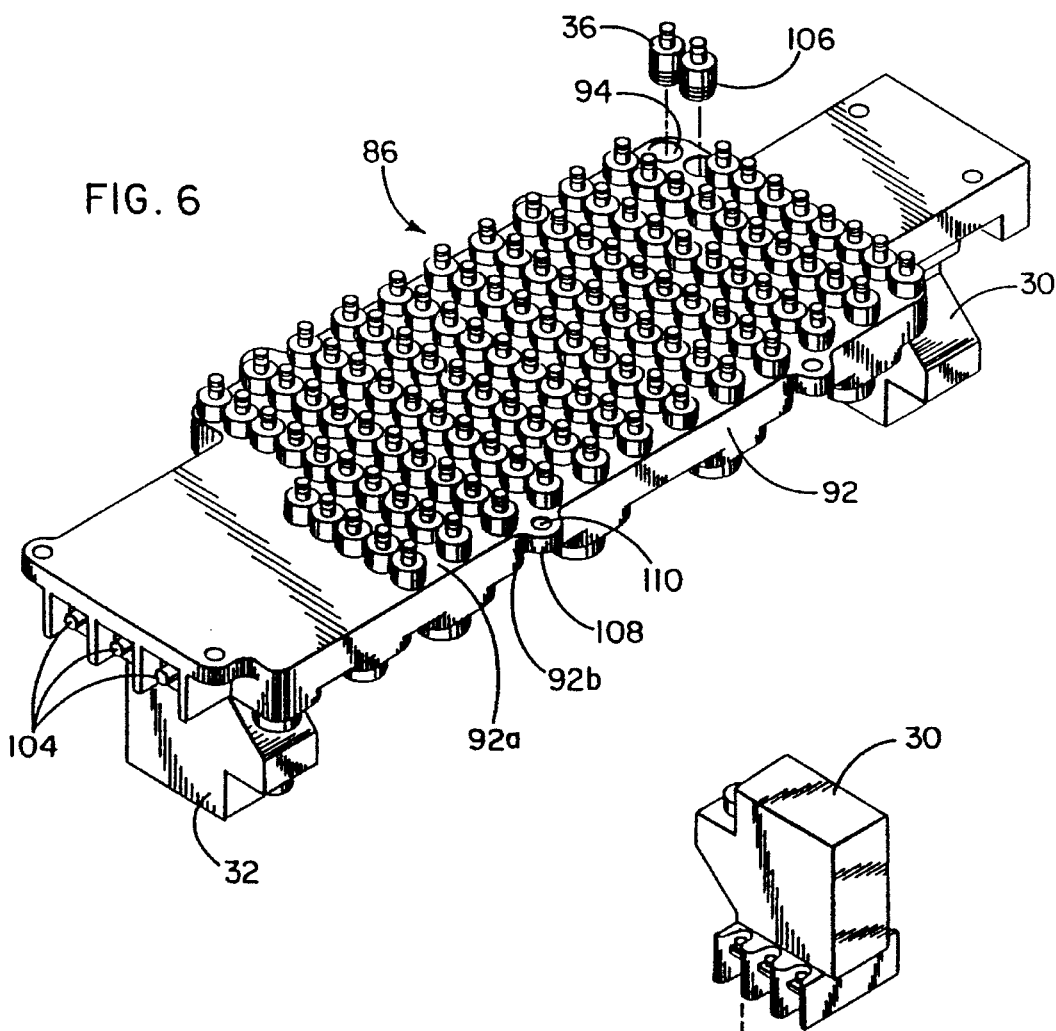
FIG. 6 is an isometric view of an exemplary embodiment of an electric power distribution center in accordance with the instant invention.
Figure 7:
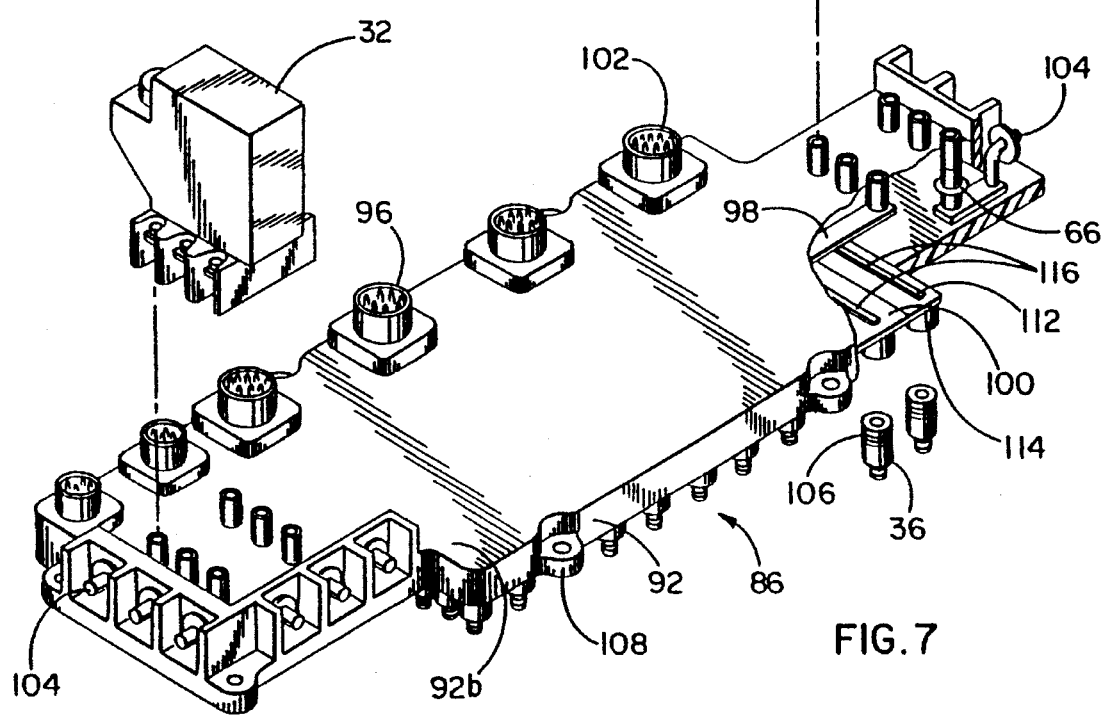
FIG. 7 is a cut-away isometric view of an exemplary embodiment of an electric power distribution center in accordance with the instant invention.

Reference is now made to FIG. 6 and FIG. 7 which illustrate both sides of a preferred embodiment of the power distribution center of the instant invention. This electric power distribution center comprises a molded space frame 92 having first 92a (see FIG. 6) and second 92b (see FIG. 7) generally parallel faces defining a volume therebetween. This first face 92a includes a plurality of sockets 94 formed therein, and the second 92b a plurality of connector ports. A plurality of conducting bus bars 98, 116 utilizing a three dimensional routing configuration are encapsulated within the molded space frame 92, and replace traditional power cable and wire approach within the power center of the prior art system. The current transformers 66 are integrally mounted within the molded space frame 92, and monitor the flow of electrical current through the conducting bus bars 98. Also encapsulated within the molded space frame 92 are circuit connection means, such as printed circuit board 100 having at least one layer construction, which provide electrical circuit pathways within the molded space frame 92. Electrical circuit isolation integrity is maintained by utilizing a molded space frame 92 which is insulative. A plurality of thermal circuit breakers 36 are seated within the sockets 94 which are formed within the first surface 92a which switchably couple the bus bars 98 to the printed circuit board 100 via additional smaller power feeders 116. Also, a plurality of connectors 102 penetrating the connector ports 96 of the second surface 92b couple the current transformers 66 and the printed circuit board to external devices such as the system control unit (not shown) and the individual pieces of utilization equipment.

Further in accordance with a preferred embodiment of the instant invention, the power distribution center 86 comprises a plurality of power feeder terminal connectors 104 penetrating the volume of the molded space frame 92 providing connection to the conducting bus bars 98. For each embodiment illustrated in FIG. 5 except the aft power distribution center 60, at least one contactor device which is electrically interposed between the power feeder terminal connectors 104 and the conducting bus bars 98 is mounted on the second face 92b. For the left central power distribution center illustrated in FIG. 6 and FIG. 7, two contactor devices, the generator line contactor 30 and the bus tie contactor 32, are used. The individual circuit breakers 36 are screw-in type devices with threads 106 that provide both electrical connection and mechanical support. An alternate to the screw-in type circuit breakers 36, such as bayonet type devices having retention means which are capable of providing both electrical connection and mechanical support, may be used.

The preferred embodiment of the electric power distribution center of the instant invention further comprises an attachment means, such as a plurality of mounting porches 108 integrally formed with and extending laterally beyond the first face 92a, each of the mounting porches 108 including a bore 110 centrally positioned therein for accepting fasteners such as bolts (not shown) for securing the molded space frame 92 to a structural member of the aircraft.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power generation and distribution system for an aircraft, comprising:

a first source of electrical energy having a predetermined rated capacity of electric power generation;

a first power distribution center having a main power input, a secondary power output, and a plurality of load distribution outputs;

a first set of main power feeders coupling said source of electrical energy to said main power input of said first power distribution center for conducting electrical energy thereto, said first set of main power feeders being of a gauge sufficient to conduct at least the rated capacity of said source of electrical energy;

a second power distribution center remotely located from said first power distribution center, said second power distribution center having a secondary power input and a plurality of load distribution outputs;

a first set of secondary power feeders coupling said secondary power output of said first power distribution center to said secondary power input of said second power distribution center for conducting electrical energy thereto, said first set of secondary power feeders being of a gauge sufficient to conduct the electrical energy required by said second power distribution center;

a second source of electrical energy having a predetermined rated capacity of electric power generation;

a third power distribution center having a main power input, a secondary power output, and a plurality of load distribution outputs;

a second set of main power feeders coupling said second source of electrical energy to said main power input of said third power distribution center for conducting electrical energy thereto, said second set of main power feeders being of a gauge sufficient to conduct at least the rated capacity of said second source of electrical energy;

a fourth power distribution center remotely located from said third power distribution center, said fourth power distribution center having a secondary power input and a plurality of load distribution outputs;

a second set of secondary power feeders coupling said secondary power output of said third power distribution center to said secondary power input of said fourth power distribution center for conducting electrical energy thereto, said second set of secondary power feeders being of a gauge sufficient to conduct the electrical energy required by said fourth power distribution center; and wherein said first power distribution center is located in close proximity to said third power distribution center in the center of the aircraft, and wherein said second power distribution center is located in the fore section of the aircraft, and wherein said fourth power distribution center is located in the aft section of the aircraft.

2. An electric power generation and distribution system as recited in claim 1, further comprising tie bus feeders coupling said first power distribution center to said third power distribution center, said tie bus feeders being of a gauge sufficient to conduct the electrical energy required by both said first power distribution center and said second power distribution center, and by both said third power distribution center and said fourth power distribution center.

3. An electric power distribution system for an aircraft having at least two engines, the aircraft generating electric power by electric generators driven by the engines, comprising:

a central power distribution center centrally located within the aircraft near the wing root, said central power distribution center electrically coupled to the generators for receiving electric power therefrom, said central power distribution center distributing electric power to utilization equipment in close proximity thereto;

a fore power distribution center located in the nose of the aircraft, said fore power distribution center electrically coupled to said central power distribution center and receiving electric power therefrom, said fore power distribution center distributing electric power to utilization equipment in close proximity thereto;

an aft power distribution center located near the tail of the aircraft, said aft power distribution center electrically coupled to said central power distribution for receiving electric power therefrom, said aft power distribution center distributing electric power to utilization equipment in close proximity thereto.

4. The system of claim 3, further comprising first means included within said central power distribution center for sensing current flow to said fore power distribution center; and second means included within said central power distribution center for sensing current flow to said aft power distribution center.

5. The system of claim 4, further comprising third means included within said fore power distribution center for sensing current flow from said central power distribution center, and fourth means included within said aft power distribution center for sensing current flow from said central power distribution center, said first means producing a first output signal proportional to sensed current flow to said fore power distribution center, said second means producing a second output signal proportional to sensed current flow to said aft power distribution center, said third means producing a third output signal proportional to sensed current flow from said central power distribution center, said fourth means producing a fourth output signal proportional to sensed current flow from said central power distribution center, and wherein differential current faults are detected by external control means between said central power distribution center and said fore power distribution center by monitoring said first and said third output signals from said first and said third means, and between said central power distribution center and said aft power distribution center by monitoring said second and said fourth output signals from said second and said fourth means.

6. The system of claim 3 wherein the aircraft additionally has an external power receptacle for receiving electric power from an external ground source, said fore power distribution center being electrically coupled to the external power receptacle for receiving electric power therefrom.

7. The system of claim 6, wherein said fore power distribution center additionally comprises an external power contactor for switchably allowing and interrupting electric power flow from the external power source.

* * * * *